March 16, 1926.
I. L. FRIEDLAENDER
RUNNING BOARD FOR MOTOR VEHICLES
Filed Sept. 14, 1925
1,577,220
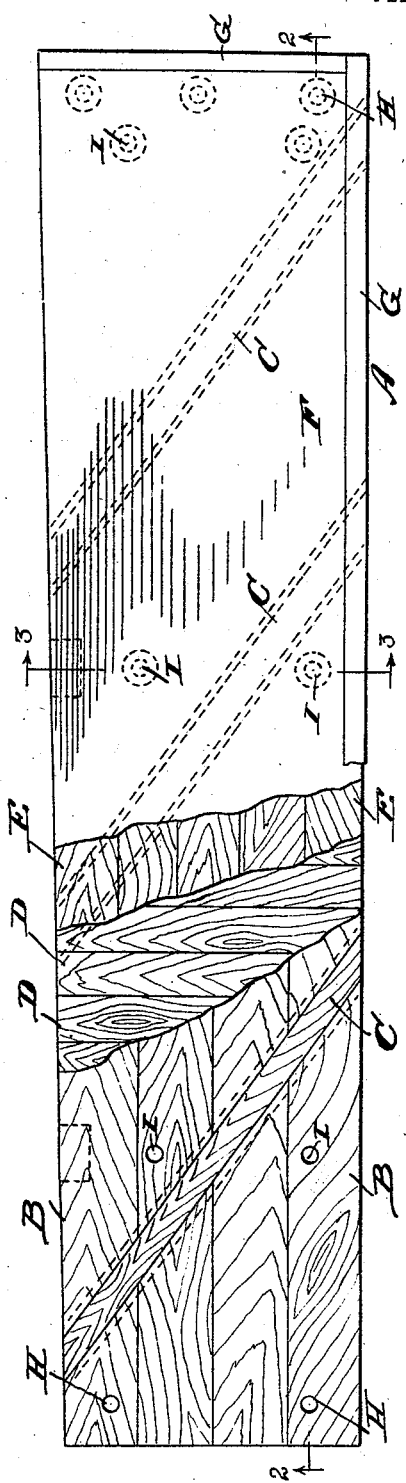
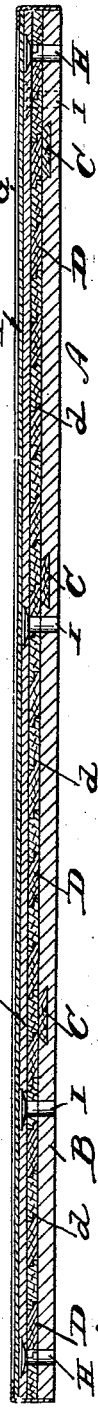
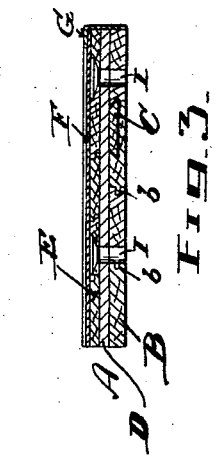
INVENTOR
Isador Leo Friedlaender
BY
J. E. Thomas
ATTORNEY Patented Mar. 16, 1926.

1,577,220

UNITED STATES PATENT OFFICE.

ISADOR LEO FRIEDLAENDER, OF DETROIT, MICHIGAN.

RUNNING BOARD FOR MOTOR VEHICLES.

Application filed September 14, 1925. Serial No. 56,274.

*To all whom it may concern:*

Be it known that I, ISADOR LEO FRIED-LAENDER, a citizen of the United States, residing at Detroit, county of Wayne, State of Michigan, have invented a certain new and useful Improvement in Running Boards for Motor Vehicles, and declare the following to be a full, clear, and exact description of the same, such as will enable others skilled in the art to which it pertains to make and use the same, reference being had to the accompanying drawings, which form a part of this specification.

My invention relates to a running board for motor or other vehicles, shown in the accompanying drawings and more particularly described in the following specification and claims.

It is well known in the automobile industry that when the running boards of motor vehicles are kept in stock in large quantities, prior to installation upon the vehicles, they are apt to warp and get out of shape to such an extent that it becomes necessary to discard a large percentage of the output manufactured for that reason.

The primary object, therefore, of this invention is to construct a running board that will maintain its shape indefinitely even though not attached to the supporting brackets of a vehicle.

A further object of the invention is to construct a running board which is relatively light and strong and one which will not sag or lose its shape under a heavy load and which is so constructed that it cannot warp either transversely or longitudinally, whether attached to the supporting brackets of a vehicle or not.

With the foregoing and other objects in view and which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a plan view of a running board constructed of laminated wood and strengthened by diagonally disposed dovetailed cleats concealed between the laminæ— the respective wood courses being broken away in order to disclose the layer immediately beneath the part removed.

Figure 2 is a longitudinal vertical sectional view through the running board.

Figure 3 is a transverse or cross-sectional view taken on or about line 3—3 of Figure 1.

Referring now to the letters of reference placed upon the drawings:

A, denotes a running board of usual shape comprising a lower course of longitudinally disposed strips B, respectively connected together by a tongue or groove joint $b$.

C, indicates diagonally disposed dove-tail cleats lodged in correspondingly shaped grooves formed in the lower course of strips A—the upper surface of the cleats being flush with the latter.

D, indicates an overlapping course of strips—having a ship-lap joint $d$—extending transversely to the strips A, and glued or otherwise secured thereto.

E, E, represent another course of strips— also provided with a ship-lap joint—extending longitudinally and overlapping the transverse strips D, D, to which they are glued—the strips E, E, are however preferably wider or narrower than the strips B, B, employed in the lower course that their longitudinal joints may not be in line with those in the first or lower course of strips.

F, denotes a covering of linoleum, rubber or other suitable tread, glued or cemented to the upper course, and G indicates the usual metallic binding strip secured to the edge of the running board and overlapping the thread.

H, H, designate holes at the end of the running board to receive the bolts employed to attach the mudguards—not shown—to the running board.

I, represent holes in the running board to receive bolts for attaching the board to the usual supporting brackets—not shown—secured to the chassis.

It will now be seen that the diagonally disposed cleats C, stiffen the running board against any tendency to warp transversely— while the several laminæ extending in different directions, as they do, insures the running board against warping either longitudinally or transversely.

While the drawing shows a running board constructed of three separate layers glued together it is obvious that any desired number of lamina may be employed;—so also the transverse boards E, E, may run either at right angles to the adjacent layer of boards or at any other angle desired.

The transverse cleats used to stiffen and give rigidity to the running board are concealed between the respective lamina in order to give a neat appearance and to protect the cleats against the entry of moisture along the line of the groove in which they are lodged and the adjacent wall.

Attention is also directed to the fact that the running board on its underside presents a smooth unbroken surface—the tongue and groove joints of the boards effectually preventing the entry of moisture.

While a running board is shown constructed of laminated boards in which is embedded a plurality of transverse dovetailed cleats, it will be obvious that a single thickness board may be employed with diagonal grooves to receive a plurality of cleats—the grooves being preferably on the upper side of the board that the cleats may be concealed by the usual linoleum tread secured to the running board.

While any number of diagonally disposed cleats may be employed I prefer that a sufficient number of cleats be used so that the forward end of each cleat on one edge of the running board will be in staggered or overlapping relation with the rear end of the adjacent cleat on the opposite edge of the running board.

Having thus described my invention what I claim is:

1. In a device of the character described, a running board, comprising a plurality of longitudinally disposed jointed strips, a plurality of overlying transversely disposed jointed strips glued to said first named strips, a further plurality of overlying longitudinally disposed jointed strips glued to the adjacent strips, and a plurality of diagonally disposed concealed cleats lodged in grooves between the layers of strips, forming in all a single unit running board.

2. In a device of the character described, a running board provided with a plurality of diagonally disposed grooves extending transversely across said board, and a plurality of cleats lodged in said grooves, the forward end of each cleat on one edge of the board overlapping the rear end of the adjacent cleat on the opposite edge of the running board.

In testimony whereof, I sign this specification.

ISADOR LEO FRIEDLAENDER.